(12) United States Patent
Shelby et al.

(10) Patent No.: US 12,392,936 B2
(45) Date of Patent: Aug. 19, 2025

(54) HMI DISPLAY COVERS HAVING LOW BIREFRINGENCE

(71) Applicant: Eastman Chemical Company, Kingsport, TN (US)

(72) Inventors: Marcus David Shelby, Fall Branch, TN (US); Robert E. McCrary, Kingsport, TN (US); Thomas Joseph Pecorini, Kingsport, TN (US); Michael Gage Armstrong, Johnson City, TN (US); Douglas Weldon Carico, Kingsport, TN (US); Michael Eugene Donelson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 884 days.

(21) Appl. No.: 17/593,865

(22) PCT Filed: Mar. 25, 2020

(86) PCT No.: PCT/US2020/024558
§ 371 (c)(1),
(2) Date: Sep. 27, 2021

(87) PCT Pub. No.: WO2020/205346
PCT Pub. Date: Oct. 8, 2020

(65) Prior Publication Data
US 2022/0163697 A1 May 26, 2022

Related U.S. Application Data

(60) Provisional application No. 62/826,059, filed on Mar. 29, 2019.

(51) Int. Cl.
*G02B 1/14* (2015.01)
*C09D 169/00* (2006.01)
*G06F 3/041* (2006.01)

(52) U.S. Cl.
CPC ............. *G02B 1/14* (2015.01); *C09D 169/00* (2013.01); *G06F 3/0412* (2013.01); *G06F 2203/04103* (2013.01)

(58) Field of Classification Search
CPC ......... G06F 3/0412; G06F 2203/04103; G02B 1/08; G02B 1/04; G02B 1/14; C09D 169/00; C08L 67/00; C08L 69/00
See application file for complete search history.

(56) References Cited

U.S. PATENT DOCUMENTS

| 4,997,903 A | 3/1991 | Okamoto |
| 6,323,291 B1 | 11/2001 | Mason et al. |
| 2014/0248483 A1 | 9/2014 | Evans et al. |

FOREIGN PATENT DOCUMENTS

JP 2005 046767 A 2/2005

OTHER PUBLICATIONS

ASTMD1238; "Standard Test Method for Melt Flow Rates of Thermoplastics by Extrusion Plastomer"; Published Apr. 2004.
(Continued)

*Primary Examiner* — Monica A Huson
(74) *Attorney, Agent, or Firm* — Robert C. Morriss

(57) ABSTRACT

Provided is an optically clear protective cover plate for Human Machine Interface (HMI) touch panel displays wherein the cover plate is formed from a thermoplastic polymer comprising a high melt flow polycarbonate. The polycarbonate is characterized by a melt flow rate (MFR), or melt flow index (MFI), of between about 60 and about 80 g/10 min (ASTM D-1238, 300° C./1.2 kg).

5 Claims, 8 Drawing Sheets

(56) References Cited

OTHER PUBLICATIONS

Notification of Transmittal of The International Search Report and The Written Opinion of the International Searching Authority, or the Declaration with a Mailing Date Jul. 28, 2020 for International Application No. PCT/US2020/024558.
PlastikCity; "Plastic Material Melt and Mould Temperatures"; Feb. 23, 2017, https://web.archive.org/web/20170223051818/https://www.Plastickcity.co.us/usefulstuff/material-melt-mould-temperatures.
Wikipedia; "Polycarbonate"; Mar. 14, 2014; http://en.wikipedia.org/wiki/Polycarbonate.

HMI DISPLAY COVERS HAVING LOW BIREFRINGENCE

CROSS-REFERENCE TO RELATED APPLICATION(S)

This application is a national stage filing under 35 USC § 371 of International Application Number PCT/US2020/024558, filed on, Mar. 25, 2020 which claims the benefit of the filing date to U.S. Provisional Application No. 62/826,059, filed on Mar. 29, 2019, the entire disclosures of which are incorporated by reference herein.

FIELD OF THE INVENTION

This invention relates generally to Human Machine Interface touch displays; in particular, it relates to certain plastic touch plate covers.

BACKGROUND OF THE INVENTION

Human Machine Interface (HMI) displays are becoming more prevalent in automobiles as they provide passengers with more control over the interior via a single interface. For example, the entertainment system, air conditioner, lighting, etc., can all be controlled by this single touch panel display via multiple selection options. HMI displays normally include an optical module of some sort (e.g., LCD panel, OLED, etc.) along with a protective, optically clear "touch plate" on the surface. The touch plate is required to be both scratch resistant (given the frequent physical contact), as well as having very low optical birefringence to minimize optical shadowing.

Glass meets these criteria and is the current material of choice but is still considered lacking because it adds extra weight and has poor impact resistance (which could lead to risk of injury during a crash). Automakers would also like to have greater design flexibility in the auto interior, including larger and more highly curved/contoured HMI panels. Such designs are simply not practical with glass, and so other options are needed.

There has been a desire to replace glass with plastic as it can be molded into different shapes more easily, while also offering better impact strength. However, molded plastics tend to have residual orientation and stress that leads to optical birefringence in the panel. This birefringence can in turn lead to undesirable optical defects, most noticeably "shadowing". Shadowing occurs, for example, whenever a driver views the HMI display wearing polarized sunglasses. The polarized lenses impart additional gradations in color and/or brightness in the panel that can make the panel appear "mottled". The only way to eliminate this shadowing currently is to use very low birefringence materials such as glass as the touch plate material.

It is also important that the low birefringence and optical clarity be maintained, without sacrificing impact strength. Some polymers such as acrylics, for example poly(methyl methacrylate) (PMMA) can be molded with sufficiently low birefringence, but such materials are inherently brittle and therefore not acceptable from a safety or reliability standpoint.

SUMMARY OF THE INVENTION

In one aspect, the invention is directed to an optically clear protective cover or cover plate for Human Machine Interface (HMI) touch panel displays wherein the cover plate is formed from polymer resin composition that includes a high melt flow polycarbonate (PC). In embodiments, the polycarbonate is characterized by a melt flow rate (MFR), or melt flow index (MFI), of between 60 and 80 g/10 min (ASTM D-1238, 300° C./1.2 kg). In embodiments, the polymer resin composition is chosen from a "standard" bisphenol-A polycarbonate or a polycarbonate-copolymer blend, for example a copolyester and polycarbonate blend. In embodiments, the blend may comprise up to about 40 weight percent of the copolyester.

It has been discovered that high melt flow polycarbonates (as described herein) can have sufficiently low and controllable birefringence, when processed for example by injection or compression molding, or by thermoforming, and can be processed into HMI cover plates which have commercially acceptable impact strength and are substantially free of optical shadowing. In embodiments, the cover plates may further comprise one or more compensation layers to provide a cover plate assembly, where the compensation layer(s) can provide the cover plate assembly with a total optical retardation that falls within an acceptable range for an HMI cover application. In embodiments, the cover plate assembly exhibits a total optical retardation that is in a range chosen from: (i) from −100 to 100 nm, (ii) from 100 to 300 nm, or (iii) from −100 to −300 nm; or alternately, in terms of absolute value of retardation of from 0 to 100 or 100 to 300. In other embodiments, the cover plate assembly exhibits a total optical retardation in a range chosen from: (i) from −80 to 80 nm, (ii) from 100 to 260 nm, or (iii) from −100 to −260 nm; or alternately, in terms of absolute value of retardation of from 0 to 80 or 100 to 260. In another embodiment, the cover plate assembly exhibits a total optical retardation in a range chosen from: (i) from −50 to 50 nm, (ii) from 130 to 230 nm, or (iii) from −130 to −230 nm; or alternately, in terms of absolute value of retardation of from 0 to 50 or 130 to 230. In embodiments, the cover plate assembly exhibits a total optical retardation (discussed above) over at least the viewable portion of the HMI display.

DETAILED DESCRIPTION OF THE INVENTION

Shadowing is an optical defect that occurs when a passenger views the HMI display while wearing polarized sunglasses. It produces variations in brightness from gray to white with the effect that the display appears distorted and/or mottled. This distortion is caused by localized variations in the birefringence. Birefringence, in turn, refers to differences in refractive index of a given transparent substrate, in different directions, which are brought on by stress and/or molecular orientation. Such shadowing usually consists of variations of gray coloring, but when the optical birefringence is large enough, it can even cause shifts in color in the display, starting at yellow, then orange, red, violet and on through the color spectrum. It is desirable that no variations in color occur and that the display remain a uniform color, for example black or gray, but white is also acceptable.

Birefringence of a substrate denoted as A, is defined as the difference in refractive index n, between any two mutually perpendicular directions. Typically, these directions will be associated with, for example, the machine direction (MD), transverse direction (TD) and thickness direction (thick). If one denotes these directions by the subscript a, b and c, then one can calculate three different values for the birefringence $$\Delta_{ab} = n_a - n_b$$

$$\Delta_{bc} = n_b - n_c$$

$$\Delta_{ac} = n_a - n_c \quad (1)$$

Only two of the three are independent, and the choice of which best to use depends on the application. Birefringence is a parameter reflecting the amount of orientation by way of the refractive index. Refractive index, in turn is an inverse measure of the speed of light in the medium assuming the light wave is polarized in that particular direction. A higher value of n means lower velocity so if $n_a > n_b$, this implies that the light wave polarized along the a direction will travel more slowly than the wave polarized in the b direction. So, given enough distance, the light wave along a will lag further behind b and become increasingly out of phase.

Figure 1:
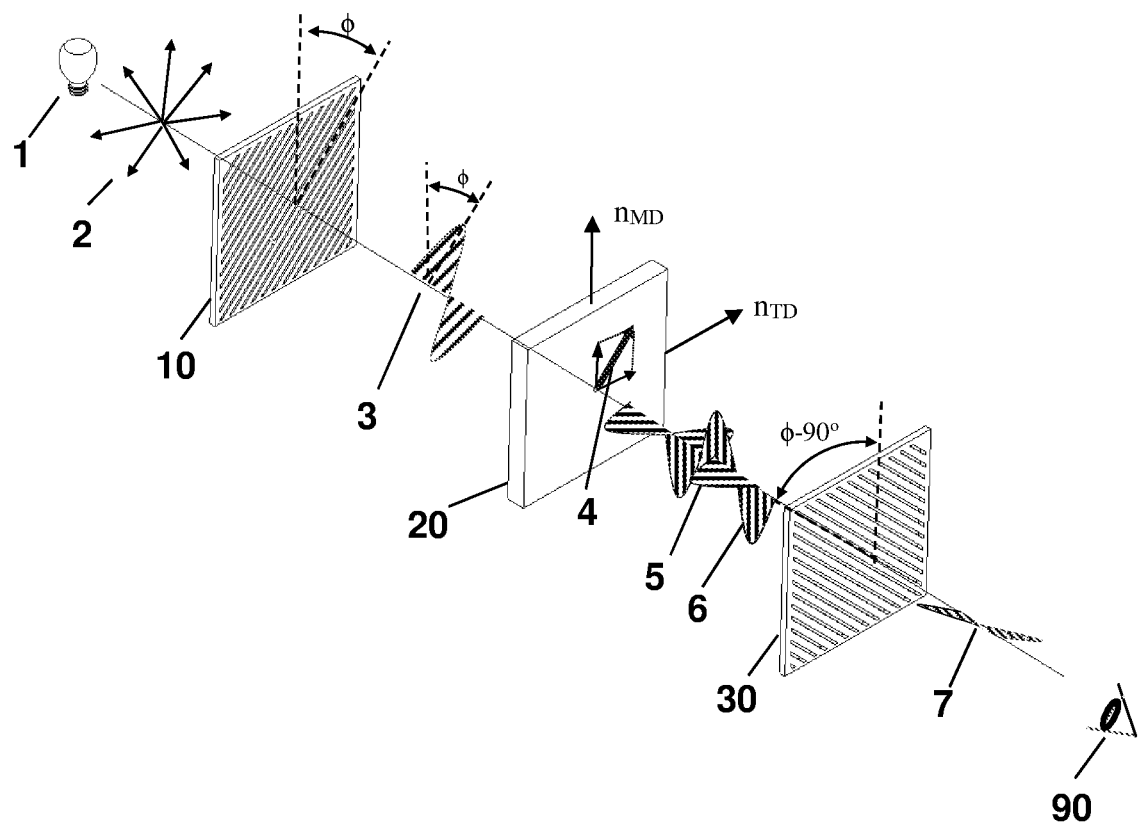
FIG. 1 is a typical crossed-polarizer setup to measure birefringence.

FIG. 1 illustrates birefringence in a sample in a typical crossed polarizer configuration. The light source 1 supplies random unpolarized light 2 to the first polarizer 10 having a polarization axis at +45 degrees to the vertical. The resulting polarized light 3 is then incident on a sample 20 of thickness L, whose principal axes are aligned with the vertical and horizontal directions and have refractive indices $n_a$ and $n_b$ respectively.

Figure 2:
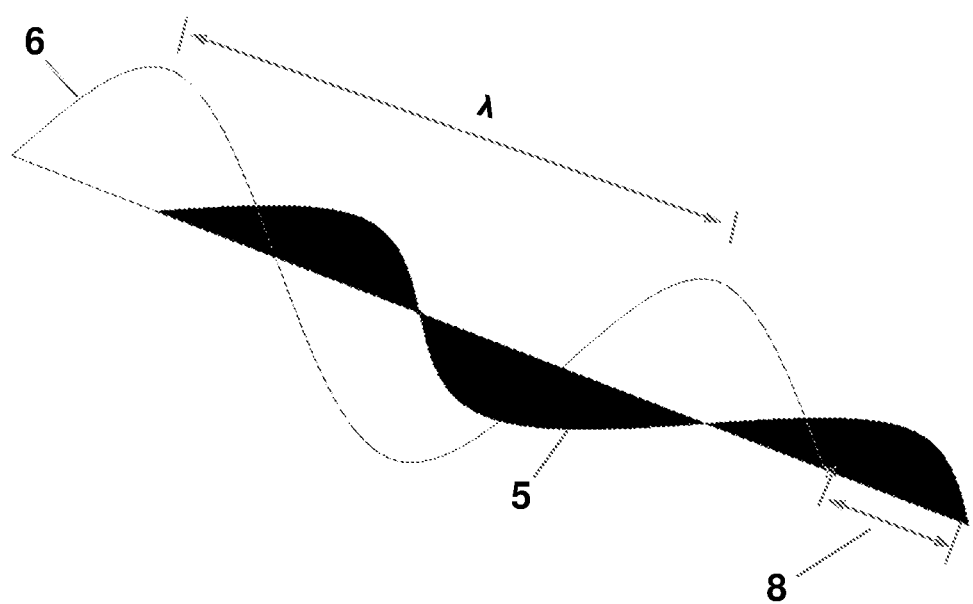
FIG. 2 is a close-up of the horizontal and vertical components of the wave illustration retardation and phase shifting.

For simplification, the incident light wave 3 can be vectorially decomposed into components along the vertical and horizontal axes. The vector direction corresponds to the direction of the electric field component of light, which is perpendicular to the propagation direction. Each of these components will then propagate through the sample at different velocities given the different refractive indices. Because of this speed difference, the exiting wave fronts 5 and 6 will be phase separated by a distance 8 (FIG. 2) which is denoted as the optical retardation. Retardation is denoted in units of nanometers, or alternatively as a fraction of the wavelength A in the medium. For plastics, the wavelength is approximately 570 nm assuming a white light source. Hence a "quarter wave" retardation is a sample having a retardation of approximately 142 nm (or one quarter of 570 nm).

When the two components 5 and 6 reach the second polarizer 30, the waves are effectively recombined to create the output wave 7 seen by the observer 50. If the retardation is zero, the waves remain in phase and add back to their original amplitude and direction. Since this combined wave is now oriented 90 degrees to the second polarizer it will be completely blocked, and a black or null state will exist where no light is transmitted. This is the same black state that would be observed if looking through two crossed polarizers with no sample present.

In contrast, if the two components are out of phase, then vectorial addition will result in a portion of the wave being aligned with the $2^{nd}$ polarizer such that it will be transmitted through. This "light leakage" will vary with the level of retardation and will go through a maximum as retardation is increased, and eventually will return to near zero at integral multiples of the wavelength assuming monochromatic light. If the retardation is equal to A then this is denoted as the first order extinction point. Likewise additional extinctions occur at 2A, 3A, etc. and are denoted as the $2^{nd}$ and $3^{rd}$ order extinction points, respectively.

For white or polychromatic light, each color corresponds to a different wavelength and each will undergo differing levels of extinction assuming a constant retardation in the part. For example, blues and violets are much shorter in wavelength than red, so they will undergo more relative phase shifting as retardation level is increased (e.g., a 100 nm retardation shift will be equivalent to a quarter wave shift if $\lambda=400$ nm but will only be $\lambda/6$ shift for a 600 nm wavelength). As the various colors undergo varying shifts in their intensity, the color of the light being transmitted changes. At zero retardation, no light is transmitted and the color appears black. As retardation increases, this color shifts from black to dark gray, and then to white at about 100 nm. It stays white from roughly 100 nm to 300 nm where it begins to shift to yellow. From yellow it shifts to orange, then red and then violet at the 570 nm first order extinction point. Above 570 nm, the color cycling essentially repeats, albeit with some slightly different color shifts. However, for the purposes of HMI cover plates, retardation levels over 570 nm are unacceptably high from a shadowing perspective.

Retardation variation from about −100 nm to +100 nm generally exhibits a black to gray appearance with minimal shadowing. Likewise, retardation variation in the 100 to 300 nm (or −100 to −300) range provides a near uniform white appearance and shows minimal shadowing. Both are thus retardation targets for the present invention.

The retardation is easily calculated for any two directions (i, j) from the thickness of the part L, as $$R_{ij} = L\Delta_{ij} \quad (2)$$

As with birefringence, there are multiple values of retardation depending on which directions are chosen. For the purposes of shadowing, there are two values that are particularly important denoted as Re and Rth. These are defined as follows:

$$Re = R_{MD\text{-}TD} = L(n_{MD} - n_{TD}) \quad (3)$$

$$Rth = L\left(n_{thick} - \frac{(n_{MD} + n_{TD})}{2}\right) \quad (4)$$

This assumes the a, b and c directions correspond to the MD, TD and thickness of the part accordingly. Re and Rth are important to shadowing for different reasons. Re represents the retardation and phase lag for light waves that are traveling normal to the surface as illustrated in FIG. 1. Note Re is not influenced by $n_{thick}$ as normal incidence waves will only be polarized in the plane directions (MD/TD).

Figure 3:
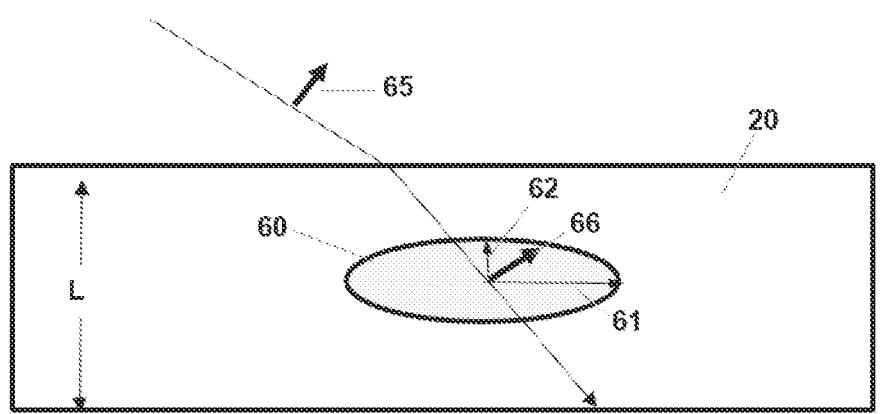
FIG. 3 depicts the effect of tilt angle on the effective refractive index.

For off-axis or tilted viewing, however, $n_{thick}$ must be considered, hence the need for Rth. This is illustrated in FIG. 3, where a light wave parallel to the page 65 is incident on the sample at an angle (the vector represents the direction and magnitude of the electric field component which is normal to the propagation direction). After undergoing refraction, this light component changes direction slightly to 66. The sample is assumed to have an anisotropic refractive index ellipsoid 60 where the refractive index in the thickness direction 62 is smaller than in the planar direction 61. This would be typical of most films or molded parts having in-plane orientation.

Refractive index is known to vary between the principal axes following an ellipsoidal shape. For normal incidence, the polarization direction will correspond to the horizontal/planar refractive index 61. But as the angle increases, the effective refractive index corresponds to the point on the ellipsoid where the polarization vector intersects. So as tilt angle increases, the effective refractive index approaches the thickness value 62. Note as mentioned below that if the thickness and planar refractive indices are identical, then 60 will take the shape of a sphere instead of an ellipsoid, and thus the effective refractive index will not change with tilt angle. Ideally, we want both Rth and Re to be small in the display cover to minimize all shadowing. It is also preferred that Rth be equal or close to Re in value so that no apparent shadowing occurs when viewing angle changes.

It is important to note that shadowing and retardation only matter in the presence of optical polarizers. In fact, shadowing can only occur if the retardation shift occurs between two polarizers such as 10 and 30 in FIG. 1. Polarizer pairs function to first isolate a certain polarization direction, which then allows relative phase shifting or retardation of the wave components to occur, and then to vectorially recombine the polarization components such that constructive and destructive interference occurs. Without these polarizers, this interference does not occur. It is for this reason that shadowing does not occur unless the viewer is wearing polarized sunglasses.

While the display module itself has a polarizer pair, the (HMI) touch plate is not between these polarizers so additional optical interference does not take place. The situation changes however, when sunglasses are worn, as now the touch plate is in between the $2^{nd}$ polarizer of the LCD module and the polarized sunglasses. Sunglasses essentially introduce a third polarizer, and thus a second polarizer pair, and everything in between these polarizers must now be accounted for when trying to reduce shadowing. The following description of examples of HMI panels is provided for further illustration.

Example of LCD Structures

Figure 4:
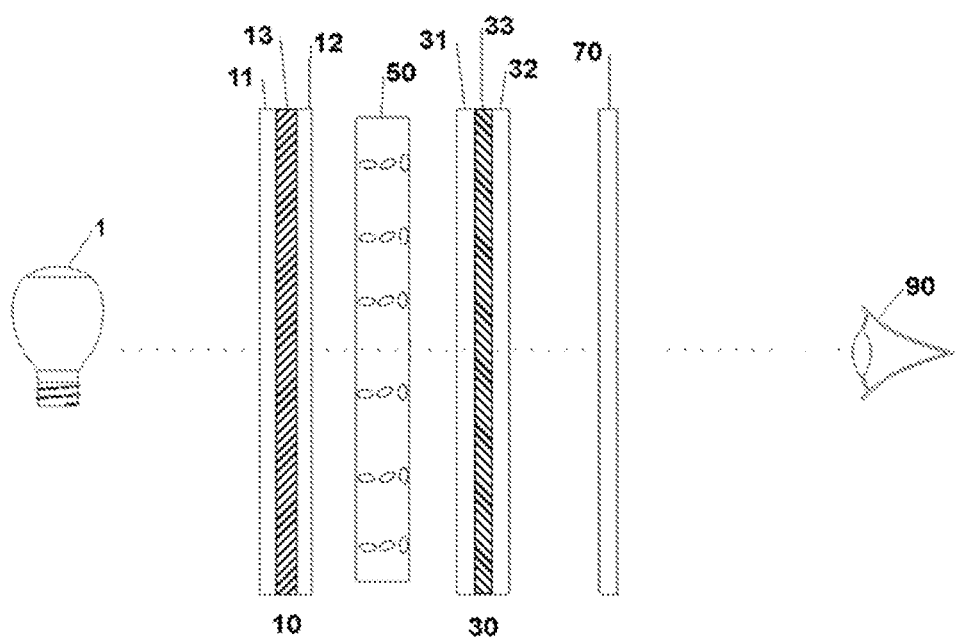
FIG. 4 depicts a schematic of a typical LCD structure.

A typical structure of an LCD based HMI panel is illustrated in FIG. 4. Elements included are only those related to the optics of the system, and other layers, such as those used for electrical switching and sensing, are not included in the drawings. It is also noted that there are many other design elements and structures that can be included in an LCD module (e.g., light diffusers, brightness enhancing films, color filters, etc.) but these are not critical to illustrate optical shadowing or the present invention and so are not shown. It is noted that these elements are typically present in the modules in one of many possible forms, and that these variations can be included embodiments of the invention.

An LCD module is very similar to the setup in FIG. 1, except now the "sample" is replaced with the liquid crystal module 50. There is a first polarizer 10 and second polarizer stack 30 as before along with some sort of backlight source 1 to provide illumination. The first polarizer has a polarization axis φ relative to the reference vertical direction with the second polarizer typically rotated 90 degrees to this direction. Typically, the angle 4) is 45 degrees, but this is not required.

Polarizers also typically include protective or "compensation" films that sandwich the active polarizing element (13 and 33). These are denoted as 11 and 12 for the first polarizer and 31 and 32 for the second. Layers 11 and 32 are usually made from solvent cast cellulose triacetate film or a cyclo-olefin. Because they are "outside" of the polarizer pair, they do not normally affect retardation, so their retardation is usually not critical. In contrast, layers 12 and 31 are between the polarizers, and so their retardation can affect visual quality. For traditional LCD applications, these films are often designed to have a certain prescribed Re and Rth, so as to cancel out any residual retardation in the liquid crystal module. By properly designing these compensation films, the viewing angle and contrast of the display are increased significantly.

The retardation effects discussed previously with regard to FIG. 1, also apply to liquid crystal displays, the difference being that the liquid crystal module 50 is a material whose birefringence is dynamically changing (as opposed to the static birefringence of the sample 20). There are different types of liquid crystal cells on the market, but regardless of type, the liquid crystal molecules change direction and alignment in response to an applied voltage. By changing this alignment and thus the birefringence, the brightness of light passing through can be modulated from dark to bright using the principles described previously, thereby turning a given pixel on or off. By passing this light through colored filters, various colors can be achieved.

Upon exiting the second polarizer, the light will then pass through the display cover 70. In most applications, such as a traditional LCD television, the light will pass through the protective cover and on to the observer. Because there is no other polarizer after the cover, its retardation has no effect on the viewing quality.

Figure 5:
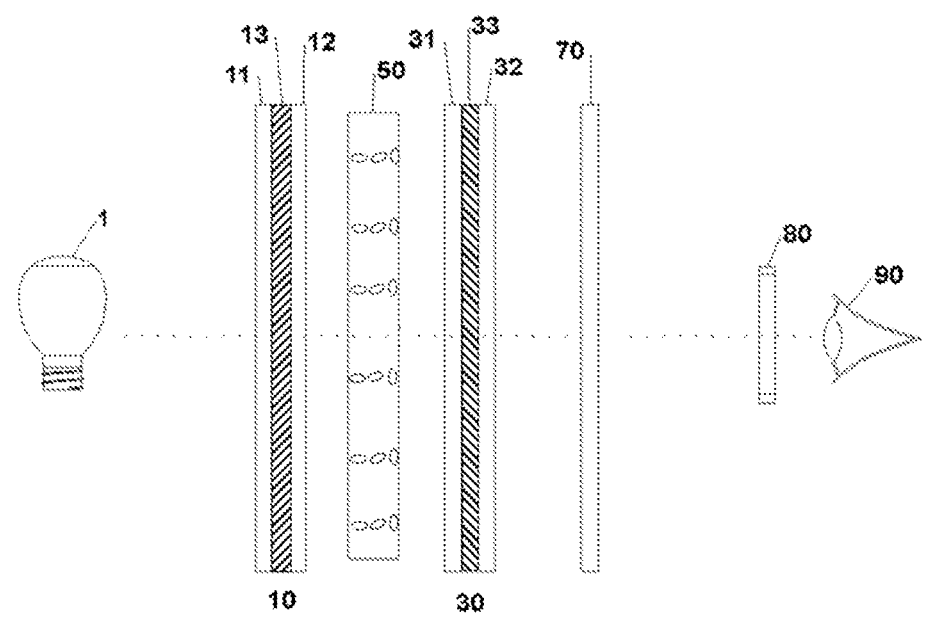
FIG. 5 is a schematic of an LCD structure assuming an observer is wearing polarized sunglasses.

This situation changes, however, if a 3rd polarizer is brought into the picture such as with an observer wearing polarized sunglasses. This is denoted as 80 in FIG. 5. These polarized glasses usually have a polarization axis aligned vertically (φ=0 degrees) as this reduces glare better since most reflected light from road and water surfaces is horizontally polarized. In this situation, layers 12, 31, 32 and 70 can all influence retardation (in addition to the liquid crystal module 50), and thus can have an impact on shadowing. Without the sunglasses, only 12 and 31 have an influence on viewing quality.

Figure 6:
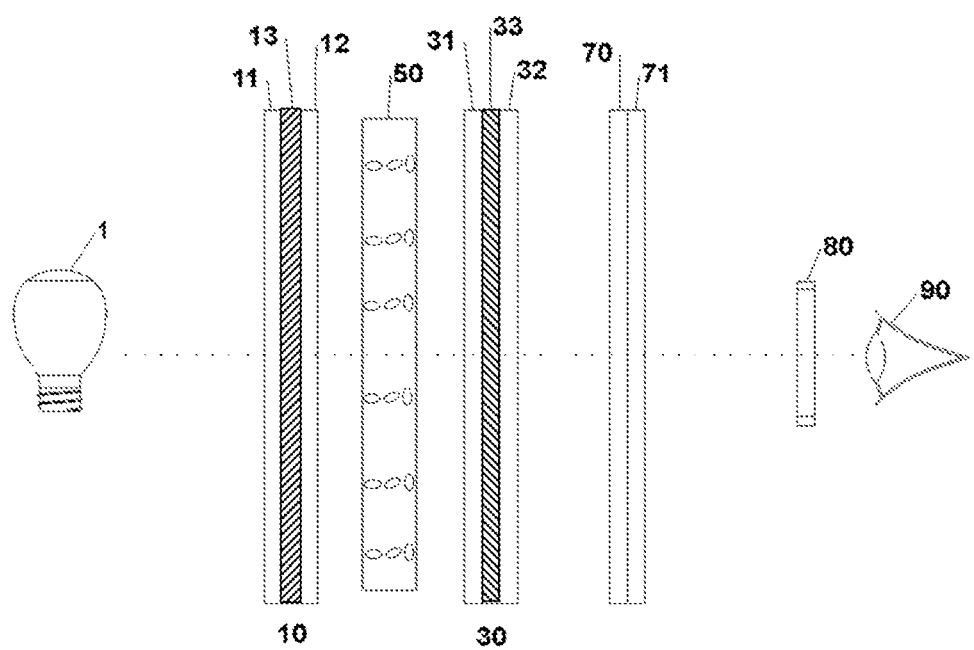
FIG. 6 is a schematic of an LCD structure assuming a compensator layer is added to the HMI touch screen.

FIG. 6 illustrates one more aspect of the invention to include an added optical compensation film denoted as 71. As mentioned previously, the films 12 and 31 are often compensation films having prescribed retardations Re and Rth and designed to cancel out some of the extraneous retardation from the liquid crystal module itself. By negating the superfluous retardation in the module 50, the panel manufacturer can considerably boost both the contrast ratio and the viewing angle performance.

In an automobile, these films (12 and 31) can also potentially influence shadowing and so one option is to modify the retardation of these films even further to reduce the perception of shadowing viewed by a passenger wearing polarized sunglasses. This option is less preferred however as tweaking the compensation films 12 and 31 would harm the visual performance under normal conditions when sunglasses are not being worn. Instead, it may be preferred to add an additional compensation layer 71 to the touch plate itself, or alternately in place of, or on top of layer 32. Films can be made to prescribed retardation levels much easier than molded products, so this offers an alternative way to shift retardation either higher or lower as needed. In embodiments, the film (shown on the touch surface) can also function as a protective layer having anti-scratch, hard coat, etc., properties applied to the surface. In embodiments, such films could also be applied on the underside of the panel if desired (not shown). Application could be by direct adhesion, in-mold labeling/decorating, etc.

In embodiments, the HMI touch panel can be bonded to a liquid crystal display component/assembly (e.g., the touch panel can be bonded to a polarizer layer, or a protective layer on the polarizer layer, that resides between the liquid crystal module and the touch panel) with a liquid optically clear adhesive (LOCA) or an optically clear adhesive (OCA) film (or tape). Such adhesives can also be used to bond a protective cover, such as a lens or hard coat layer to the touch panel. In embodiments, the adhesive is cured with ultraviolet light (UV), heat, moisture, or a combination, depending on the manufacturer and specifications for the LOCA or OCA.

In embodiments, the LOCA or OCA can improve the optical performance of the display, e.g., by eliminating air gaps between the layers being bonded. In embodiments, such optical bonding can improve the contrast ratio by reducing the amount of reflected light, thus improving viewability. Reflection from the touch panel screen or a protective cover layer, as well as the adhesive can degrade LCD viewability. Reflection can be caused by an impedance mismatch between air and one or more of the layers. The reflection can make the white brighter, but dilute black and other colors, which can decrease contrast. In certain embodiments, the LOCA is selected to match the refractive index of the HMI touch panel to minimize loss. In embodiments, the LCOA or OCA comprises acrylic-based and/or silicone-based chemistry.

In embodiments, the touch panel is molded with in mold decoration (IMD) or in mold labeling (IML) to provide indicia and/or passive haptic features. In embodiments, the IMD or IML are films that transfer decoration and/or UV curable hard coated surfaces to the plastic touch panel. IML films have the coating against the mold. The molten thermoplastic (e.g., cellulose ester thermoplastic) is injected such that it contacts the film surface facing the mold interior and has good adherence to the thermoplastic. Once the molded part drops out of the mold, the coating on the IML film is subjected to a UV curing step that hardens the surface and can impart scratch and chemical resistance. Other functionalities that can be imparted to the outward facing surface (of the molded part) include anti-fingerprint (oleophobic properties), antiglare and/or anti-reflective attributes. In embodiments, the indicia may be related to the control functions of the HMI unit. In embodiments, multi-color screen-printed and offset lithography printed graphics can be used to produce the indicia or graphics. In certain embodiments, second surface graphics are used, where the decoration is printed on the back side of a clear substrate film, e.g., polycarbonate, acrylic or cellulosic film, and injection plastic is contacted on the ink side of the film (e.g., during injection molding). This encapsulates the decoration between the film layer and the injected plastic resulting in a decoration that can't be abraded during use. In embodiments, vision systems can be used to ensure accurate label positioning and can validate label correctness. In embodiments, printing can be performed by any known methods, such as digital printing (e.g., inkjet or xerography), spraying, transfer printing, flexography, gravure, etc.

In embodiments, the thickness of the touch panel module constructed using IMD or IML is comparatively thinner to a similar touch panel constructed using LOCA or OCA bonding for the printed layer. In embodiments, IMD techniques can be used to provide hard coats and/or ink transfer indicia.

HMI Display Production

In one embodiment, the HMI touch plate is prepared via injection molding or compression injection molding (CIM). Both techniques have been used for making optical discs. A third option is the use of thermoforming, particularly to make larger panels. Thermoforming requires the extrusion of sheet that is heated and formed into a mold. It has the advantage that larger size parts are possible, but disadvantages of high scrap rate, potentially higher stress levels and difficulty in molding in lugs and attachment points.

A key aspect with any production technique is the minimization of birefringence. There are two primary types of birefringence, namely orientation birefringence and "glassy" or stress related birefringence. The former arises from residual chain orientation left in the part after molding, whereas the latter results from thermal stresses that form during cooling of the part. Both components will change independently for each production method.

Polycarbonate (PC) is disadvantaged relative to materials like PMMA with respect birefringence, in that a very small change in residual stress (or residual orientation) will cause a large change in birefringence. This sensitivity is often quantified via the stress optical coefficient (SOC) which is the change in birefringence that occurs for a unit change in stress.

$$\Delta_{ij} = SOC^*(\sigma_i \sigma_j) \qquad (5)$$

where σi is the stress in the i direction. There are two values of SOC for a given material, one for stressing above the glass transition temperature in the rubbery state ($SOC_R$), and the other for stressing in the glassy state ($SOC_G$). The former relates to orientational birefringence and the latter is a more traditional stress related birefringence. For PC, both SOC values are typically much higher than for acrylic, which makes low birefringence molding more difficult.

Figure 7:
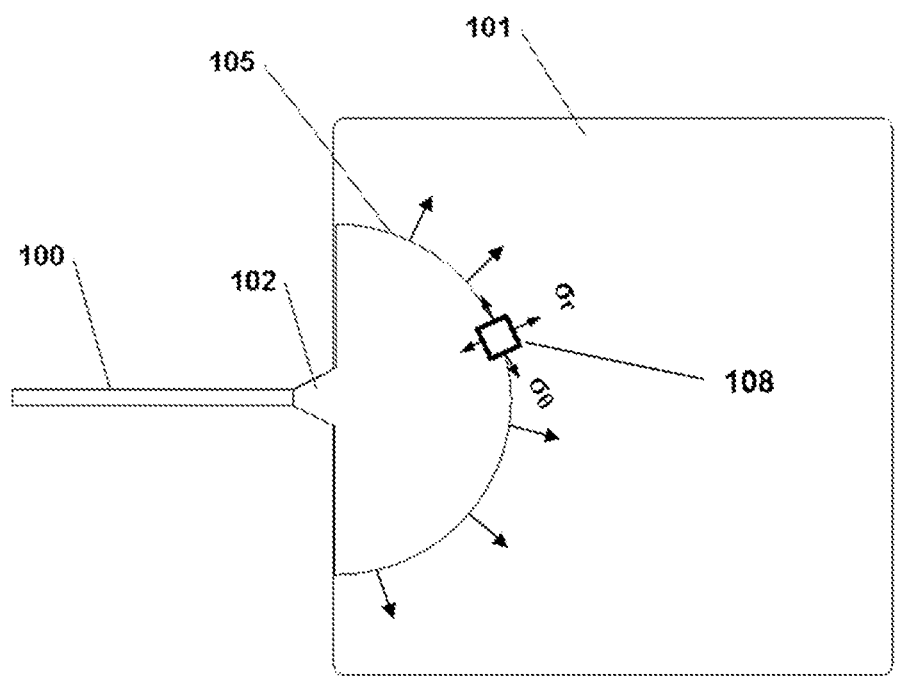
FIG. 7 is a depiction of an injection mold containing a tab gate with associated polymer flow front.

During injection molding, the geometry and gating of the mold are very important with respect to the effect on stress and birefringence. FIG. 7 shows a simple plaque mold 101 with a tab gate 102, along with the flow front of polymer entering the mold 105. Polymer entering through the runner 100 is already experiencing orientation and alignment and this continues as it enters the mold.

Figure 8:
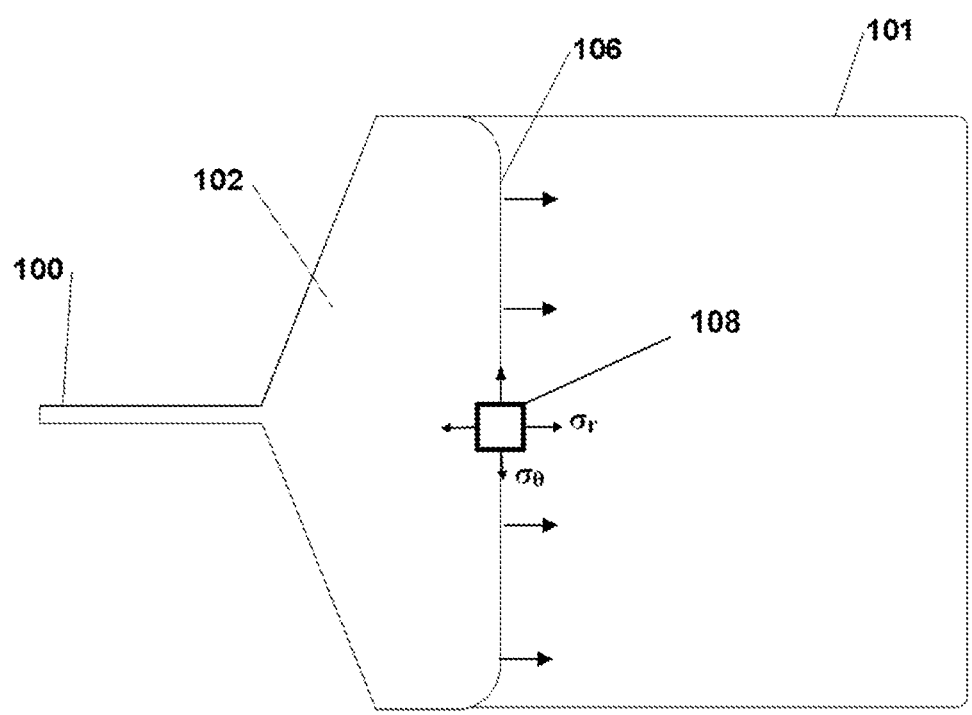
FIG. 8 is a depiction of an injection mold containing a fan gate with associated polymer flow front.

In the case of this small tab gate, a radially progressing type flow takes place that is analogous to inflation of a balloon. The polymer is being stretched radially as well as circumferentially which results in primary stresses σr and σe in the radial and hoop directions (108). As shown in formula (5) above, the birefringence increases as the relative stress difference increases and the stress difference tends to be very high closer to the gate. Because of this radial stress pattern, the orientation and birefringence profiles will have a similar radial geometry which serves to amplify shadowing as there will be more angular dependence. Therefore, in embodiments, it is preferred to go with a wider fan or film type gate that provides for a more uniform flow front through the part. This is illustrated in FIG. 8 where the flow from 106 is now more uniform and molecular orientation will also be more consistent across this part. This will reduce angular dependence of shadowing as the stress difference 108 will be more consistent.

Compression injection molding is an alternative to standard injection molding in that the mold is initially kept partially open during filling to reduce flow stresses, but then closed to produce the final part. For thinner items like optical discs, this can reduce birefringence more than traditional injection molding alone.

In one embodiment, part thickness for HMI displays will range from about 1 mm up to about 10 mm, or 1 mm to 8 mm, or 1 mm to 5 mm, or about 2 mm to about 10 mm, or 2 mm to 8 mm, or 2 mm to 5 mm, or from greater than 2 mm to 5 mm, or from 2 mm to 4 mm, or from 2 mm to 3 mm. The thickness has an important effect on birefringence and retardation since, as already mentioned, the retardation is equal to the birefringence multiplied by the thickness. So, all things being equal, a thicker part will have higher retardation. However, it has been discovered that thicker parts may have reduced filling pressures and thus a reduced level of orientational birefringence. So even though the thickness is higher, the average birefringence across the part may be lower and so sometimes the overall retardation will decrease. Thicker parts are otherwise preferred from an impact and crashworthiness standpoint, although not too thick as this adds extra weight. In embodiments, the thickness is about 2 to 3 mm.

It has been discovered that molding with hotter polymer melt temperatures can also help reduce birefringence by lowering viscosity and reducing overall stress and orientation formation. There is usually a practical upper limit on molding for most materials before excessive degradation and/or flashing becomes a problem.

Mold temperatures can also be increased to reduced stressing although this can make cycle times longer (due to a longer cooling cycle). Mold temperature has a particularly strong influence on residual stress and the resulting stress induced birefringence brought about by cooling. To help reduce this further, parts can also be annealed after molding at a temperature close to the glass transition temperature $T_g$. This can minimize the stress component of birefringence but usually does not impact the orientational birefringence. Also, it is less desirable in that it adds significantly to cycle time and cost.

Other processing parameters such as the injection rate/pressure can influence the birefringence formation and fill rates can be profiled to optimize birefringence. It has been discovered that birefringence can be reduced, particularly in the gate area, by running at higher injection fill rates, particularly at the end of filling. Likewise hold pressures should also be kept high, but low enough to prevent flashing. If fill rates are too low, it is believed that cooling effects are too strong during filling which drives up orientational birefringence as the material must flow past a more viscous skin layer.

Lowering the molecular weight of polymers can reduce the viscosity as well as the orientation that results during molding. This approach has been used for reducing birefringence in polycarbonate optical discs, but it comes at the expense of reducing impact strength. Molecular weight can be quantified in different ways, but it is common to refer to molecular weight indirectly via the melt flow rate (MFR) expressed in grams of flow per 10 minutes at 300° C. under a 1.2 kg load. Allow MFR is sometimes reported to be measured at 250° C. instead of 300° C., MFR for purposes of this application is measured at 300° C. (as discussed above). Molecular weight can also be quantified by melt volume rate (MVR) instead of MFR where the volume of flow in cubic centimeters is measured rather than the mass, under the same conditions. To convert from MVR to MFR, the MVR value is multiplied by the melt density which is 1.08 g/cc for PC.

It has been found that traditional lower MFR PC grades (offered for molding articles) produce too much birefringence and are not practical for HMI cover plates. It has been discovered that higher MFR grades of PC, in contrast, will result in lower birefringence, but impact strength is typically reduced.

Surprisingly, it has been discovered that certain MFR grades of polycarbonate can be used to produce HMI display panels which exhibit both adequate shadowing elimination and sufficient toughness.

Accordingly, in a first aspect, the invention provides a Human Machine Interface (HMI) cover in the form of a sheet, having a thickness of about 2 mm to about 5 mm, comprising a thermoplastic polymer comprising (i) polycarbonate or (ii) a polycarbonate having up to about 40 weight percent of a copolyester blended therein, wherein said thermoplastic polymer has a melt flow rate of between about 60 and about 80 g/10 minutes as determined by ASTM D-1238 (300° C./1.2 kg). In a further embodiment, the Human Machine Interface cover of the invention further comprise one or more compensation layers and possess a total optical retardation that is either in the range of
  (i) −100 to 100 nm,
  (ii) 100 to 300 nm, or
  (iii) −100 to −300 nm.

In other embodiments, the Human Interface cover of the invention further comprising one or more compensation layers possess a total optical retardation that is either in the range of −80 to 80 nm, 100 nm to 260 nm, or −100 nm to −260 nm.

The polycarbonate may be a bisphenol-A polycarbonate or a polycarbonate-copolyester blend. In embodiments, the blend may contain up to about 40 weight percent of a copolyester. It has been discovered that such materials can have sufficiently low and controllable birefringence when the material is processed for example by injection molding, compression molding or thermoforming. It has been discovered that such materials can be processed into HMI cover plates which have commercially acceptable impact strength and are substantially free of optical shadowing.

In embodiments, the polycarbonate can be a standard bisphenol-A type polycarbonate. In other embodiments, copolymers and polycarbonates subject to other modifications can be used as well. For example, copolymers of copolyester and polycarbonate are contemplated herein as well. The melt flow rate (MFR), or melt flow index (MFI), is in one embodiment, between about 60 and about 80 g/10 min, as determined by ASTM D-1238 (300° C./1.2 kg). Traditional stabilizers, catalysts, impact modifiers, flame retardant agents, reinforcing agents and the like which are well known in the polycarbonate and polyester arts may be used to the extent such additives are of a type and/or in an amount that does not cause the cover to have unacceptable optical or strength properties, as described herein. Examples of additives that are contemplated for use include Irgafor® and Irganox® antioxidants, available from BASF and Tinuvin® and Uvinil® light stabilizers, available from BASF.

In embodiments, the thermoplastic polymer can contain up to about 40 weight percent of a copolyester, but the polycarbonate/copolyester blend should retain a blend $T_g$ of 105° C. or greater, or 110° C. or greater, to withstand thermal stressing inside an automobile. Because of fitness for use and processability requirements, in embodiments, the Tg of the blend can be in the range from 105° C. to 160° C., 105° C. to 150° C., 110° C. to 160° C., or 120° C. to 150° C. In embodiments, the thermoplastic polymer can be a polycarbonate, or a blend of polycarbonate and copolyester, that contains 0 to 40 weight percent copolyester, or 0 to 30 weight percent copolyester, or 0 to 25 weight percent copolyester, or 0 to 20 weight percent copolyester, or 0 to 10 weight percent copolyester, or 0 to 5 weight percent copolyester, or 0 to less than 5 weight percent copolyester, or greater than 0 to 40 weight percent copolyester, or 1 to 40 weight percent copolyester, or 5 to 40 weight percent copolyester, or 10 to 40 weight percent copolyester, or 20 to 40 weight percent copolyester, or 30 to 40 weight percent copolyester.

In embodiments, the copolyester is miscible with the polycarbonate. In embodiments, the copolyester can be produced from one of more diols chosen from cyclohexanedimethanol (CHDM), tetramethylcyclobutanediol (TMCD), butanediol and/or ethylene glycol, and one or more diacids chosen from terephthalic acid, isophthalic acid, and/or cyclohexanedicarboxylic acid (CHDA).

In embodiments, the copolyester comprises a diol component that comprises residues of CHDM, and a diacid component that comprises residues of CHDA, wherein the copolyester has excellent miscibility with the polycarbonate and provides a blend having reduced orientational birefringence compared to the polycarbonate by itself. In another embodiment, the copolyester comprises a diol component that comprises residues of CHDM, TMCD and/or EG, and a diacid component that comprises residues of terephthalic acid and optionally isophthalic acid. In one embodiment, the copolyester is chosen from PCTG or poly(1,4-cyclohexylenedimethylene 1,4-cyclohexanedicarboxylate) (PCCD).

In one embodiment, the polyesters useful in the invention can comprise glycol residues in the amount of 15 to 40 mole % 2,2,4,4-tetramethyl-1,3-cyclobutanediol and 60 to 85 mole % 1,4-cyclohexanedimethanol; 20 to 40 mole % 2,2,4,4-tetramethyl-1,3-cyclobutanediol and 60 to 80 mole % 1,4-cyclohexanedimethanol; 20 to 35 mole % 2,2,4,4-tetramethyl-1,3-cyclobutanediol and 65 to 80 mole % 1,4-cyclohexanedimethanol; 20 to 30 mole % 2,2,4,4-tetramethyl-1,3-cyclobutanediol and 70 to 80 mole % 1,4-cyclohexanedimethanol; 30 to 40 mole % 2,2,4,4-tetramethyl-1,3-cyclobutanediol and 60 to 70 mole % 1,4-cyclohexanedimethanol; 20 to 25 mole % 2,2,4,4-tetramethyl-1,3-cyclobutanediol and 75 to 80 mole % 1,4-cyclohexanedimethanol; and 30 to 35 mole % 2,2,4,4-tetramethyl-1,3-cyclobutanediol and 65 to 70 mole % 1,4-cyclohexanedimethanol. In one embodiment of the invention, the polyesters useful in the invention can comprise diacid residues in the amount of 70 to 100 mole %, or 80 to 100 mole %, or 90 to 100 mole %, of terephthalic acid, isophthalic acid, or esters thereof or mixtures thereof.

In one embodiment, the polyesters useful in the invention can comprise glycol residues in the amount of 10 to 27 mole % 2,2,4,4-tetramethyl-1,3-cyclobutanediol and 73 to 90 mole % ethylene glycol; In one embodiment of the invention, the polyesters useful in the invention can comprise diacid residues in the amount of 70 to 100 mole %, or 80 to 100 mole %, or 90 to 100 mole %, of terephthalic acid, isophthalic acid, or esters thereof or mixtures thereof.

In one embodiment, the polyesters useful in the invention can comprise glycol residues in the amount of 80 to 100 mole % 1,4-cyclohexanedimethanol; or 90 to 100 mole % 1,4-cyclohexanedimethanol. In this embodiment of the invention, the polyesters useful in the invention can comprise diacid residues in the amount of 70 to 100 mole %, or 80 to 100 mole %, or 90 to 100 mole %, of dimethylcyclohexane dicarboxylate (DMCD) (i.e. hydrogenated DMT). Any isomer of DMCD can be present in any amount; in one embodiment, the trans isomer can be present in the majority, i.e., greater than 50 mole %, or greater than 60 mole %, or greater than 70 mole %, greater than 80 mole %, or greater than 90 mole % trans DMCD.

In one embodiment, the polyesters useful in the invention can comprise glycol residues in the amount of 50 to 100 mole % 1,4-cyclohexanedimethanol and 0 to 50 mole % ethylene glycol; 50 to 95 mole % 1,4-cyclohexanedimethanol and 5 to 50 mole ethylene glycol; 50 to 90 mole % 1,4-cyclohexanedimethanol and 10 to 50 mole % ethylene glycol; 50 to 80 mole % 1,4-cyclohexanedimethanol and 20 to 50 mole % ethylene glycol % ethylene glycol; 50 to 70 mole % 1,4-cyclohexanedimethanol and 30 to 50 mole % ethylene glycol. In one embodiment of the invention, the polyesters useful in the invention can comprise diacid residues in the amount of 70 to 100 mole %, or 80 to 100 mole %, or 90 to 100 mole %, of terephthalic acid, isophthalic acid, or esters thereof or mixtures thereof.

For the polyesters described herein, the total mole percentages of the glycol component is equal to 100 mole %, and the total mole percentages of the acid component is equal to 100 mole %.

Examples of commercially available blends of polycarbonates and copolyesters that are suitable for use for making an HMI cover in accordance with the invention include XYLEX™ resins (available from SABIC) that meet the final required properties for the HMI cover, as discussed herein.

In embodiments, in addition to having a $T_g$ of at least 100° C., the display panel must also meet certain impact requirements. In embodiments, a cover panel made from the thermoplastic polymer having a thickness of 1 mm to 10 mm, or 1 mm to 8 mm, or 1 mm to 5 mm, or 2 mm to 10 mm, or 2 mm to 8 mm, or 2 mm to 5 mm will survive impact of a 1.05 kg steel ball from a height of 20" (50.8 cm) at both room temperature and −30° C. without breaking. This height represents an impact energy of 5.2 Joules. Because of the variety of panel geometries available, the panel is supported on a 4" (10.2 cm) diameter tube with impact at the center of the panel or plaque.

In order to have an HMI display panel without shadowing, it is important for the total retardation of all "optically active layers" to fall within one of two ranges, as follows:

1. The first is from −100 nm to 100 nm, or −80 nm to 80 nm, as this constitutes the "gray" region on a Michel-Levy chart for light transmission through crossed polarizers using a uniform white light source. The display in this retardation range will always look black or gray, and so shadows will be minimal.
2. The second is from 100 nm to 300 nm or −100 nm to −300 nm, or from 100 nm and 260 nm or −100 and −260 nm, as this constitutes the "white" portion of the light transmission. Here shadowing will also be minimal although the panel will appear uniformly white instead of gray.

The reason for targeting one of these two areas, is that the color changes very little with a given change in retardation. In contrast, for retardations above 260 nm, or above 300 nm (or below −260 nm, or below −300 nm) range, the effective color is changing rapidly through non-grayscale values (yellow initially) as retardation is increased. Consequently, even small variations in retardation will produce noticeable shifts in color. It should also be noted that if a portion of the panel is in the gray region, but another portion is in the "white" region, there will be an unacceptable level of apparent shadowing. The entire viewing area (or in one embodiment, the entire panel) should be in one or the other, but not both. Likewise, these ranges listed are the minimum considered to be acceptable but even lower variation ranges around 0 nm or around 180 nm (or −180 nm) are preferred.

Insofar as the above acceptable ranges roughly span 160 nm of retardation, it is desirable that the difference between the maximum and minimum retardation of the polycarbonate part (at least over the viewable area of the HMI cover) be less than or equal to about 160 nm. In embodiments, the maximum variability in retardation that a part can have over the entire viewable area and still be acceptable is 160 nm. However, if the mean retardation from the part does not fall within the target range, it can be shifted via the addition of an optically active compensation layer to the cover plate.

As an example, a part having a mean retardation of 100 nm, with the maximum value being 150 nm, and the minimum being 50 nm, would have unacceptable shadowing if used by itself, because part of the retardation is in the gray region, and part in the white region. However, since the retardation range (max−min) is only 100 nm, the mean value can be shifted downwards using a −100 nm optically active compensation layer. This shifts the mean to 0 nm, the min value shifts to −50 nm and the max value shifts to 50 nm. Now all points are within the −80 to +80 nm gray region and so shadowing is minimized. Alternately, the mean value could have been shifted upwards so that the entire range falls in the white region.

The "optically active layers" constitute all layers between the second polarizer of the display 33, and the polarized sunglasses 80. Therefore, the outer protective layer 32 of the second polarizer, the HMI display 70, and any protective/compensation layer(s) applied to the display 71 (or alternately applied in between 32 and 70) can be considered optically active layers. The sum of the in-plane retardation should be substantially in one of the two ranges described above. It is accepted that areas around the gate or on the edges may be outside of the acceptable range if these areas are hidden (e.g., outside the viewable area of the HMI cover) and/or removed as part of the installation.

In embodiments, the display panel is 2 to 5 mm, or 2 to 4 mm, or 2 to 3 mm, thick and will survive impact at room temperature and −30° C. using a 1.05 kg steel ball dropped from a height of 20" (50.8 cm) without breaking. In embodiments, the HMI display covers are larger than typical molded optical discs and are non-symmetric in geometry, both of which make it much harder to meet the low birefringence requirements (as discussed herein).

In embodiments, the HMI cover panel is produced by injection molding, compression injection molding, or thermoforming and can optionally be annealed to further reduce birefringence. In embodiments, the cover is injection molded and the gate is at least 50% or greater, or at least 60%, or at least 70%, or at least 80%, of the width of the cover on the entry side of the mold, in order to reduce angular dependence of retardation.

In an aspect, a method for making the Human Machine Interface cover is provided that includes the steps of:
(a) providing a mold configured for injection molding, the mold comprising a gate at one end of the mold having an opening configured to introduce molten thermoplastic polymer into the mold, and a mold width at the gate end of the mold of at least 150 mm, wherein the gate opening has a width that is at least 50% of the mold width; and
(b) injection molding said cover at a barrel temperature of at least the thermoplastic polymer Tg (in ° C.)+170° C.

In embodiments, the gate opening has a width that is at least 60% of the mold width. In embodiments, the barrel temperature is at least the thermoplastic polymer Tg (in ° C.)+190° C. In embodiments, the thermoplastic polymer is polycarbonate having a MFR of 60 to 80 g/10 min (as discussed herein) and the cover is made by injection molding at a barrel temperature of at least 310° C., or at least 315° C., or at least 320° C., or at least 325° C., or at least 330° C., or at least 335° C., or at least 340° C., or at least 345° C.; or in a range from 310° C. to 360° C., or from 320° C. to 360° C., or from 330° C. to 360° C., from 340° C. to 360° C., or from 310° C. to 355° C., or from 320° C. to 355° C., or from 330° C. to 355° C., or from 340° C. to 355° C., or from 310° C. to 350° C., or from 320° C. to 350° C., or from 330° C. to 350° C., or from 340° C. to 350° C.

In embodiments, the method further comprising injection molding the cover at an injection speed of at least 1.3 cm/s, or at least 2.0 cm/s, or at least 3.0 cm/s, or at least 4.0 cm/s.

The optically active layers can be produced by various means including solvent casting, extrusion, stretching and so forth. In embodiments, compensating layers can be made from one or more cellulose esters. In another embodiment, compensating layers can be made from oriented polycarbonate, e.g., in the case of common quarter wave plate films. Additional layers can also be incorporated to improve scratch resistance, glare etc. These "hardcoat" layers might be applied to a compensating film, for example, which is then adhered to the polycarbonate display panel using in-mold labeling techniques, direct adhesion, coating, or other methods known in the art. In embodiments, the hard coat is chosen from a silicone based hard coat, (poly)siloxane hard coat, urethane based hard coat, or acrylic based hard coat.

This invention can be further illustrated by the following examples of certain embodiments thereof, although it will be understood that these examples are included merely for purposes of illustration and are not intended to limit the scope of the invention unless otherwise specifically indicated.

Experimental Section

The following experimental methods were used to characterize molded articles of the present invention.

The melt flow rate, or melt flow index (MFI), is measured following ASTM D-1238 at 300° C. and with a 1.2 kg load.

Optical birefringence in the plane (Re) was characterized by one of two means. First is by using a Strainoptics™ PS-100SF polarimeter. Testing was conducted in "plane polarization" mode with optimization quantified either with the rotating analyzer method, or with the Strainoptics™ LWC-100 wedge compensator. Measures were made at multiple points across the part and the max and min points also noted.

When both Re and Rth values are needed, testing was performed with a Woolam™ ellipsometer. The ellipsometer performs a series of measurements at different tilt angles, and then extrapolates retardation results to a full 90 degree tilt in order to determine Rth.

Impact strength is determined at room temperature and −30° C. Impact is performed with a 1.05 kg steel ball dropped from a height of 4" (10 cm) and 20" (50.8 cm). The panel is supported on a 4" (10.2 cm) diameter tube. This height represents a maximum impact energy of 5.2 Joules and the sample must survive impact with no cracks or breaks in order to pass the test.

Examples 1 Through 24. Effect of Processing Conditions

Rectangular plaques were injection molded on a Toyo Plastar™-200G2 molding machine having a 50 mm screw and 397 cc shot capacity. A designed experiment was conducted using a variety of processing conditions and resins. Rectangular plaques with dimensions of 10.2 cm by 15.2 cm and a thickness of 2.5 mm were produced. The mold was filled with a film type gate along the entire 10.2 cm short side of the plaque.

Three different polycarbonate resins were used to make molded plaques, as follows: Makrolon™ 2458 (19 MVR or 20 MFR), Makrolon™ 2207 (35 MVR or 38 MFR) and Tarflon™ LC1500 (65 MVR or 70 MFR). The Makrolon resins were supplied by Bayer (Covestro) and the Tarflon resin by Idemitsu Kosan Company. In addition to the polycarbonate samples, a PMMA polymer Acrylite™ H12 (Evonik Industries) was also tested as a control.

Mold temperature was fixed at 82° C. for the PMMA samples and 88° C. for the polycarbonate samples. Barrel temperature, and injection speed were all varied to determine optimal conditions. Retardation values (Re) were then measured at the center of the plaque, and 1 cm from the gated end of the plaque. Maximum and minimum values were also noted over the entire part, excluding the 2 cm region near the gate. Although it was believed the retardation levels would be higher near the gate region, it was assumed that the high retardation area could be incorporated into a larger gate area that would be removed and/or hidden from view upon final assembly of an HMI panel. The molding conditions and Re results are listed in Table 1.

A review of Table 1 reveals that only Sample 18 fell within the desirable target retardation range (−100 to 100 nm) and/or had a retardation variability less than 160 nm. This was produced using the 65 MVR (70 MFR) sample running at hotter barrel temperature and fast injection rate. Samples 14 and 17 were close to target and may be made acceptable by simply using a larger gate/manifold region. Other processing conditions did not produce sufficiently low variability in retardation and would have produced unacceptable shadowing. Likewise, the lower MVR samples were not even close to the required retardation targets.

The acrylic samples (Examples 1 through 6) also had low retardation profiles but are not useful because of their low impact strength.

Examples 25 Through 28

In these example, additional plaques were molded for impact testing using the same materials and equipment as above. Thickness of the plaques was 2.5 mm. The results are listed in Table 2. A review of Table 2 reveals that the PMMA samples failed impact testing. The low MVR PC samples were expected to pass, but it was surprising to find that the high MVR PC (Example 26) also passed the impact testing.

Examples 29—HMI Panel with Optically Active Compensating Layer

In this example, a 2 mm thick HMI panel was molded using the 65 MVR PC described previously. The panel was 160 mm wide on the gated end and expanded to 200 mm on the far end. The length of the panel was 150 mm, with the part curving slightly to reflect a possible HMI touch cover shape. A fan gate was used that was roughly 65% of the width of the part. The panel was molded at 315° C. barrel temperature using a fast injection rate. The maximum retardation was measured to be 171 nm and the minimum was approximately 50 nm. The average value was approximately 110 nm.

When viewed through crossed polarizers, the part appeared mostly white but with some slight gray "mottling" occurring in some areas because the retardations spanned the gray and white regions. To correct for this, the mean value of retardation was shifted upwards by 60 nm using a compensation layer. The compensation layer was produced by uniaxially stretching a cellulose acetate propionate (CAP) film made from Eastman CAP 482-20 polymer, by 2× at 150° C. using a Brueckner laboratory film stretcher. This film was added in line with the panel such that the retardations added together, thereby shifting the mean value to 170 nm (near the center of the "white" region). The resulting composite structure had a much more uniform white appearance with minimal shadowing.

Prophetic Example 30—PC/Polyester Blend

In this prophetic example, 30 wt % of PCCD polyester (e.g., PCCD commercially available from Eastman Chemical Company) is blended with the 65 MVR polycarbonate described previously. The polymers are known to be miscible, and the Tg of the blend is nominally 120° C., which is lower than for PC by itself, but still sufficient for the application. The display panel is molded in a manner similar to Example 1 at 300° C. barrel temperature and using a fast injection rate. Because PCCD has a lower intrinsic birefringence than PC, the retardation is expected to be even lower than for the previous examples. Likewise, PCCD is also a tough polymer and can be run at higher MW while keeping birefringence low. Toughness of the molded parts is also expected to be good.

TABLE 1

Plaque Injection Molding Data

| Number | Polymer | MFR | Barrel Temp (C.) | P (MPa) | Inj Speed (cm/s) | Re (center) | Re (end) | Re(min) | Re(max) | Re (range) |
|---|---|---|---|---|---|---|---|---|---|---|
| 1 | PC | 20 | 316 | 14.7 | 1.3 | 2020 | 216 | 0 | >2800 | >2800 |
| 2 | PC | 20 | 316 | 12.0 | 4.1 | 289 | 72 | 0 | 1372 | 1372 |
| 3 | PC | 20 | 332 | 12.5 | 1.3 | 1083 | 72 | 0 | >2800 | >2800 |
| 4 | PC | 20 | 332 | 10.9 | 4.1 | 1011 | 50 | 0 | 1155 | 1155 |
| 5 | PC | 20 | 349 | 10.5 | 1.3 | 627 | 57 | −20 | 1877 | 1897 |
| 6 | PC | 20 | 349 | 9.9 | 4.1 | 40 | 22 | 0 | 1300 | 1300 |
| 7 | PC | 38 | 316 | 12.6 | 1.3 | 340 | 110 | −57 | 1155 | 1212 |
| 8 | PC | 38 | 316 | 10.6 | 4.1 | 86 | 55 | 0 | 1155 | 1155 |
| 9 | PC | 38 | 332 | 11.1 | 1.3 | 1054 | 72 | −46 | 1054 | 1100 |
| 10 | PC | 38 | 332 | 9.2 | 4.1 | 0 | 28 | 0 | 177 | 177 |
| 11 | PC | 38 | 349 | 9.1 | 1.3 | 68 | 0 | 0 | 1588 | 1588 |
| 12 | PC | 38 | 349 | 8.5 | 4.1 | 154 | 0 | 0 | 939 | 939 |
| 13 | PC | 70 | 316 | 10.2 | 1.3 | 570 | 0 | −50 | 570 | 620 |
| 14 | PC | 70 | 316 | 9.2 | 4.1 | 15 | 17 | 0 | 171 | 171 |

TABLE 1-continued

Plaque Injection Molding Data

| Number | Polymer | MFR | Barrel Temp (C.) | P (MPa) | Inj Speed (cm/s) | Re (center) | Re (end) | Re(min) | Re(max) | Re (range) |
|---|---|---|---|---|---|---|---|---|---|---|
| 15 | PC | 70 | 332 | 9.4 | 1.3 | 296 | 28 | −57 | 399 | 456 |
| 16 | PC | 70 | 332 | 8.5 | 4.1 | 22 | 0 | 0 | 720 | 720 |
| 17 | PC | 70 | 349 | 7.1 | 1.3 | −29 | −6 | −29 | 125 | 154 |
| 18 | PC | 70 | 349 | 5.7 | 4.1 | −40 | −11 | −23 | 68 | 91 |
| 19 | PMMA | | 221 | 10.0 | 1.3 | −86 | −34 | −86 | 17 | 103 |
| 20 | PMMA | | 221 | 9.2 | 4.1 | −57 | −29 | −63 | 11 | 74 |
| 21 | PMMA | | 238 | 9.2 | 1.3 | −57 | −11 | −86 | 0 | 86 |
| 22 | PMMA | | 238 | 7.9 | 4.1 | −46 | −17 | −34 | 0 | 34 |
| 23 | PMMA | | 254 | 7.8 | 1.3 | −34 | −11 | −46 | 0 | 46 |
| 24 | PMMA | | 254 | 6.4 | 4.1 | −23 | 0 | −34 | 11 | 46 |

TABLE 2

Plaque Impact Data (1.05 kg Steel Ball)

| Sample | Description | 10 cm/ 23 C. | 10 cm/−30 C. | 50 cm/ 23 C. | 50 cm/−30 C. |
|---|---|---|---|---|---|
| 25 | PMMA | Fail | fail | fail | fail |
| 26 | PC, 70 MFR | Pass | pass | pass | pass |
| 27 | PC, 38 MFR | Pass | pass | pass | pass |
| 28 | PC, 20 MFR | Pass | pass | pass | pass |

What is claimed is:

1. A method for making the Human Machine Interface cover in the form of a sheet, having a thickness of about 2 mm to about 5 mm, said cover comprising a thermoplastic polymer comprising:
   a polycarbonate having up to about 40 weight percent of a copolyester blended therein, wherein the copolyester is miscible with the polycarbonate and comprises a diol component that comprises residues of cyclohexanedimethanol (CHDM) and an acid component that comprises residues of terephthalic acid (TPA), and
   wherein said thermoplastic polymer has a melt flow rate of between about 60 and about 80 g/10 minutes as determined by ASTM D-1238 (300° C./1.2 kg), said method comprising the steps:
   (a) providing a mold configured for injection molding, said mold comprising a gate at one end of the mold having an opening configured to introduce molten thermoplastic polymer into the mold, and a mold width at the gate end of the mold of at least 150 mm, wherein the gate opening has a width that is at least 50% of the mold width; and
   (b) injection molding said cover at a barrel temperature of at least the thermoplastic polymer Tg (in ° C.)+170° C.

2. The method of claim 1, wherein the gate opening has a width that is at least 60% of the mold width.

3. The method of claim 2, wherein the barrel temperature is at least the thermoplastic polymer Tg (in ° C.)+190° C.

4. The method of claim 1, further comprising injection molding said cover at an injection speed of at least 1.3 cm/s.

5. The method of claim 4, wherein the injection speed is at least 3.0 cm/s.

* * * * *